United States Patent [19]

Yung Chu et al.

[11] Patent Number: 4,992,280

[45] Date of Patent: Feb. 12, 1991

[54] SUSTAINED FLAVORANT RELEASE COMPOSITION, METHOD FOR MAKING SAME AND CHEWABLE STRUCTURE INCORPORATING SAME

[75] Inventors: Anita W. Yung Chu; Joseph R. Robinson, both of Madison, Wis.

[73] Assignee: Columbia Laboratories, Inc., Hollywood, Fla.

[21] Appl. No.: 452,214

[22] Filed: Dec. 18, 1989

[51] Int. Cl.⁵ .................................................. A23G 3/30
[52] U.S. Cl. ........................................... 426/5; 426/96; 426/98; 426/534; 426/651; 426/302
[58] Field of Search ........................................ 426/3–6, 426/534, 651, 96, 98, 302

[56] References Cited

U.S. PATENT DOCUMENTS

| | | | |
|---|---|---|---|
| 2,973,273 | 2/1961 | Curtiss | 426/5 |
| 3,071,476 | 1/1963 | Werft et al. | 426/132 |
| 3,455,755 | 7/1969 | Phillips | 426/5 |
| 3,795,744 | 3/1974 | Ogawa et al. | 426/3 |
| 3,826,847 | 7/1974 | Ogawa et al. | 426/3 |
| 4,515,769 | 5/1985 | Merritt et al. | 426/96 |
| 4,740,376 | 4/1988 | Yang | 426/650 |
| 4,891,209 | 1/1990 | Heim | 426/5 |
| 4,933,189 | 6/1990 | Cherukuri et al. | 426/5 |

*Primary Examiner*—Jeanette Hunter
*Attorney, Agent, or Firm*—Dressler, Goldsmith, Shore, Sutker & Milnamow, Ltd.

[57] ABSTRACT

A sustained flavorant release composition is provided for use in a chewable structure. The flavorant release composition consists essentially of a homogenous dispersion of a liquid flavorant agent and polyvinyl acetate having a number average molecular weight of about 150,000 to about 200,000 daltons. The weight ratio of the liquid favorant agent to polyvinyl acetate is about 1:5 to about 5:1, respectively. A method of producing the flavorant release composition includes admixing the polyvinyl acetate, dissolved in a volatile, nonreactive organic solvent, with the flavorant release agent at a temperature at which the flavorant release agent does not degrade. The solvent is then removed. The chewable structure includes the flavorant release composition and a gum base composition.

23 Claims, 1 Drawing Sheet

SUSTAINED FLAVORANT RELEASE COMPOSITION, METHOD FOR MAKING SAME AND CHEWABLE STRUCTURE INCORPORATING SAME

DESCRIPTION

1. Technical Field

This invention relates to a sustained flavorant release composition, a method for making it, and a chewable structure incorporating it.

2. Background of the Invention

Chewing gum compositions conventionally include a water-insoluble gum base composition having distributed throughout water-soluble sweeteners and a flavorant agent. A deficiency in chewing gums is exhaustion of the sweetness and flavor sensations in a relatively short time period after onset of mastication. This exhaustion usually occurs in a time period of less than 10 minutes.

In an attempt to increase this time period, techniques for encapsulation and resulting sustained release of the sweetener and flavorant agent have been developed. U.S. Pat. No. 4,590,075 to Wei et al. provides examples of methods of encapsulation. Those methods include encapsulating, in granular form, the sweetener and flavorant agent in water insoluble compounds.

An effective encapsulating composition for a chewing gum should simultaneously protect an active ingredient from moisture degradation while providing controllable release thereof. For example, U.S. Pat. No. 3,826,847 to Ogawa et al. and U.S. Pat. No. 3,795,744 to Ogawa et al. teach utilizing a polyvinyl acetate (PVAC) having a polymerization degree of 200 to 1500 (i.e., a number average molecular weight of 17,200 to 129,000 daltons) to encapsulate the flavorant agent.

U.S. Pat. No. 4,711,784 to Yang teaches that high molecular weight PVAC is not useful as a chewing gum flavorant encapsulating agent without combining such PVAC with a plasticizer, such as a glyceride, which is not a flavorant agent. A high molecular weight PVAC has a molecular weight greater than 20,000 molecular weight units (MWU) as determined by gel permeation chromatography. The molecular weight as expressed in MWU and daltons are substantially identical. Yang also teaches that granules of encapsulating agent containing flavorant agent are added to a gum base composition at elevated temperatures usually associated with gum preparation, such as 45 to 55 degrees C.

Furthermore, U.S. Pat. No. 4,386,106 to Merritt et al. teaches that the use of PVAC as an encapsulating agent is undesirable because a substantial amount of flavor becomes "fixed" therein. Therefore, these flavors are retained within PVAC which prevents proper release of flavor. Merritt et al. also teaches that a cross-linking agent or continuous gum arabic or gelating film is required in a chewing gum when spearmint oil or cinnamic aldehyde is utilized as a flavor with PVAC because these flavors are good solvents for PVAC.

Sustained release of a flavorant agent for a time period in excess of one hour after onset of mastication is desirable in a chewable gum. It would also be desirable to prepare such a chewing gum from a simplified composition that does not require cross-linking agents or films to separate the chewing gum components or a plasticizing agent distinct from the flavorant agent.

SUMMARY OF THE INVENTION

The present invention contemplates a sustained flavorant release composition suitable for providing sustained release of a flavorant for a chewable structure during mastication. The flavorant release composition consists essentially of a homogenous dispersion of a liquid flavorant agent and polyvinyl acetate (PVAC). The PVAC has a number average molecular weight of about 150,000 to about 200,000 daltons. The weight ratio of the liquid flavorant agent to the PVAC is about 1:5 to about 5:1, respectively.

The flavorant release composition is substantially free of a separate plasticizing agent that is distinct from the liquid flavorant agent. That is, the liquid flavorant agent itself performs both the functions of the flavorant and the plasticizing agent in conventional systems. The use of a PVAC having this number average molecular weight and of a flavorant agent that itself performs these two functions is contrary to the teachings described before.

Optionally, the flavorant release composition can further include a sweetening agent that is also released over an extended period of time.

The sustained flavorant release composition can be shaped into a flavor releasing element and used in a chewable structure. One such structure comprises at least one flavor releasing element juxtaposed with a gum stock element composed of a gum base composition. The weight ratio of the gum base composition to the total weight of all of the flavorant release composition utilized is preferably about 20:1 to about 4:1, respectively.

The present invention also contemplates a method of producing the sustained flavorant release composition. This method consists essentially of the steps of admixing a before-described PVAC dissolved in a volatile, nonreactive organic solvent with the liquid flavorant agent in a weight ratio of liquid flavorant agent to PVAC of about 1:5 to about 5:1, respectively, and removing the solvent to produce the sustained flavorant release composition. The organic solvent is substantially non-reactive with the sustained flavorant release composition and constituents thereof. Admixing is carried out at a temperature at which there is substantially no degradation of the liquid flavorant agent and at which the admixture is deformable.

The present invention can be utilized to separate components in the flavorant release composition from components in the gum stock composition until mastication. This separation of components is desirable when the components are incompatible, as when contacting thereof results in degradation of either composition over time, change in flavor sensation provided by the flavorant agent over time or the like.

Numerous advantages and features of the present invention will become readily apparent from the following description of the preferred embodiments, the accompanying drawings, and the appended claims.

DESCRIPTION OF THE PREFERRED EMBODIMENTS

Although this invention is susceptible to embodiments in many different forms, only some preferred embodiments of the invention are shown. It should be understood, however, that the present disclosure is to be considered as an exemplification of the principles of this invention and is not intended to limit the invention to the embodiments illustrated.

One form of the invention is a sustained flavorant release composition suitable for providing sustained release of a flavorant agent in a chewable structure during mastication. The sustained flavorant release composition consists essentially of a homogenous dispersion of at least one liquid flavorant agent and polyvinyl acetate (PVAC) having a number average molecular weight of about 150,000 to about 200,000 daltons. The weight ratio of the liquid flavorant agent to the PVAC is about 1:5 to about 5:1, respectively.

The rate of release of the flavorant agent can be varied by varying the amount, and/or the number average molecular weight within the above weight range, of the PVAC utilized. Furthermore, the flavorant release composition is substantially free of a separate plasticizing agent that is distinct from the liquid flavorant agent and provides prolonged release of the flavorant agent during mastication. That is, the flavorant agent itself functions as a plasticizing agent in addition to functioning to provide flavor.

The sustained flavorant release composition of the present invention, discussed in more detail hereinafter, is suitable for use in any chewable structure that is comestible or in any chewable product that is not normally swallowed, such as chewing gum.

Figure 1:
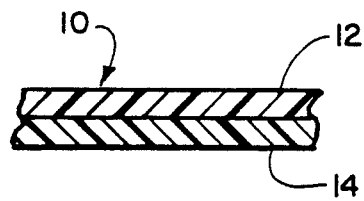
FIG. 1 is a greatly enlarged, fragmentary, longitudinal cross-sectional view of a first embodiment of a chewable structure embodying the present invention that includes one sustained flavor releasing element and a gum stock element.

A first embodiment of an illustrative chewable structure is illustrated in FIG. 1 and is designated generally therein by the reference numeral 10. The structure 10 includes a sustained flavor releasing element 12 attached to, carried by, or otherwise associated with a gum stock element 14, such that the two elements are juxtaposed.

The sustained flavor releasing element 12 includes at least the above-described flavorant release composition and is initially provided in a selected, suitable shape so as to define, along with the gum stock element 14, the structure 10.

The gum stock element 14 can be a conventional gum base composition formed into the desired shape. Suitable gum base compositions include conventional chewing gum base compositions, including bubble gum base compositions.

A typical gum base composition can include polyvinyl acetate of a lower molecular weight, polyvinyl propionate, ethyl cellulose, chicle, jelutong or ester gum alone or in a mixture blended with a plasticizer such as dibutylphthalate, butylphthalyl butyl glycolate, methylacetylcyanate or the like together with other additives such as calcium carbonate, talc, wax, polyisobutylene and/or polybutylene that act to plasticize the blend as well as to modulate the hardness, the viscoelasticity and the formability of the gum base composition. The gum base composition can also include known gum additives including sweeteners, salts, acidifying agents, other spices, and colorants. Furthermore, the gum base composition can be a commercially available chewing gum having flavor.

Illustrative gum stock compositions include those commercially available from L. A. Dreyfuss Co., South Plainfield, N.J., Trident gum commercially available from Warner-Lambert and various chewing gums commercially available from the Wrigley Co., Chicago, Ill.

The sustained flavorant release composition consists essentially of PVAC and at least one liquid flavorant agent.

The PVAC utilized in the sustained flavorant release composition has a number average molecular weight of about 150,000 to about 200,000 daltons as discussed above. A preferred number average molecular weight is about 160,000 to about 175,000 daltons.

The term "dalton", as used herein in its various grammatical forms, defines a unit of mass that is 1/12th of the mass of carbon-12.

The PVAC encapsulates the liquid flavorant agent. The term "encapsulate", as used herein in its various grammatical forms, defines the microscopic relationship of the PVAC enclosing the liquid flavorant agent.

The liquid flavorant agent is a natural, modified or synthetic flavorant agent that provides a sensation of flavor in the buccal cavity upon mastication of the flavorant release composition. Thus, by recitation of a flavorant agent, a flavor-producing amount of the flavorant agent is present. A single flavorant agent can be used as can mixture of two or more flavorant agents. Regardless of whether one or more specific, identifiable flavorant agents is used, the flavorant agent will be considered to be a single entity herein, unless specific components are mentioned.

Although the flavorant agent of the invention is a liquid at usually encountered temperatures such as zero to 100 degrees C., and functions to provide the flavor, this liquid flavorant agent also functions as a plasticizing agent. This dual function eliminates the need for a separate plasticizing agent (i.e., one that is not also a flavorant agent). Thus, the present flavorant release composition is substantially free of a plasticizing agent distinct from the liquid flavorant agent.

A non-exclusive list of illustrative liquid flavorant agents, that function both as a plasticizing agent and to provide a sensation of flavor during mastication, includes spearmint oil, cinnamon oil, oil of wintergreen, peppermint oil, lemon oil, orange oil, grape oil, lime oil, tangerine oil, grapefruit oil, apple essence, strawberry essence, cherry essence, pineapple essence, peach essence, raspberry essence, mixtures thereof and the like. See Furia, *Handbook of Food Additives* 2nd, CRC Press, Cleveland, Ohio, pp. 475-511, for additional flavorant agents and common chemical components and flavor characteristics thereof.

Concentrated flavoring oils including folded oils and essence can also be utilized.

Essence can be obtained from fruit extracts. Alternatively, the flavor strength of the extract can be reinforced by combining 51 weight percent of the basic extract with 49 weight percent of a combination of other natural flavorings to increase the flavor strength. Such an extract is commonly referred to as a With Other Natural Flavors (WONF) extract. See, *Handbook of Food Additives*, at p. 468. These WONF extracts are also suitable for use in the present invention.

Exemplary flavorant agents exhibit various solubilities in water and alcohol (ethanol). For example, 1 volume of cinnamon oil dissolves in 2 volumes of 70 percent alcohol, 1 volume of peppermint oil dissolves in 3 volumes of 70 percent alcohol and 1 volume of spearmint oil dissolves in 1 volume of 80 percent alcohol, *The National Formulary XVI*, United States Pharmacopeial Convention, Inc., Rockville, Md., 1985. Oil of wintergreen is miscible in alcohol and slightly soluble in water, *The Merck Index*, Tenth Edition, Merck & Co., Rahway, N.J.

The weight ratio of the liquid flavorant agent to the PVAC is about 1:5 to about 5:1, preferably about 1:2 to about 2:1, respectively.

A cross-linking agent or a continuous gum arabic or gelatin film is not needed even when a flavorant agent that is a good solvent for PVAC is utilized. Thus, a composition of the invention is typically free from cross-linking agents, gum arabic or gelatin film.

Optionally, the flavorant release composition further includes a sweetening agent that can be homogeneously dispersed throughout the flavorant release composition and released over an extended period of time. This optional sweetening agent can be a natural or synthetic sweetener.

The optional sweetening agent is present in a sweetening effective amount. This sweetening effective amount is preferably about 0.001 to about 10 percent, more preferably less than about 0.1 weight percent of said flavorant release composition.

Illustrative optional sweetening agents include aspartame, dextrates, dextrose, dextrose excipient, fructose, mannitol, saccharin, saccharin calcium, saccharin sodium, sorbitol, sorbitol solution, sugar, syrup and the like. The sweetening agent can be used singly or in conjunction with another sweetening agent.

This invention also contemplates the use of two or more flavorant release compositions in a single chewable structure. The weight ratio of the gum base composition to the total weight of all flavorant release compositions utilized in the chewable structure is about 20:1 to about 4:1, preferably about 10:1 to about 5:1, respectively. That is, even when more than one flavorant release composition is utilized, as discussed in detail hereinbelow, the sum of the weight of all of these flavorant release compositions is utilized in determining the above weight ratio.

A method of producing the sustained flavorant release composition of the present invention consists essentially of the steps of admixing PVAC dissolved in a volatile, nonreactive organic solvent, discussed hereinafter, with a liquid flavorant agent to produce a homogenous dispersion. The solvent is then removed from the homogenous dispersion to produce the flavorant release composition. The number average molecular weight of the PVAC is as discussed hereinabove, as is the weight ratio of the liquid flavorant agent to the PVAC.

It is not known if the admixing of PVAC and organic solvent produces a true solution, an emulsion, colloidal suspension or a dispersion. However, to the naked eye this admixture appears to be, and behaves like a solution, and is thus referred to herein as a solution.

The admixing is carried out at a temperature at which there is substantially no degradation of the flavorant agent and at which the admixture is deformable. Furthermore, the homogenous dispersion is substantially free of a separate plasticizing agent that is distinct from the liquid flavorant agent.

A further, more detailed, illustrative method of producing the sustained flavorant release composition of the present invention consists essentially of the following steps. Dissolving the PVAC in a volatile, nonreactive organic solvent at a temperature greater than about 20 degrees C. and below the boiling point of the solvent to form a solution. Admixing the solution with the liquid flavorant agent at an elevated temperature to obtain a homogenous dispersion. Cooling the homogenous dispersion, and finally removing the solvent from the homogenous dispersion to produce the flavorant release composition. The solution and homogenous dispersion exhibit a deformable viscosity at the temperature of their individual formulations.

Suitable volatile, nonreactive organic solvents include solvents that have boiling points, under atmospheric pressure, at a temperature preferably less than about 250 degrees C., more preferably less than about 100 degrees C. The temperature of the boiling point is preferably greater than the admixing temperature discussed hereinbelow.

The nonreactive solvent is nonreactive with the sustained flavorant release composition and constituents thereof, e.g., the PVAC, the flavorant agent and the sweetening agent. The term "nonreactive", as used herein in its various grammatical forms, indicates that the solvent does not make or break chemical bonds, except possibly hydrogen bonds, and may solvate protons.

Illustrative volatile, nonreactive organic solvents include ethanol, chloroform, methanol, trichloroethylene, ethylene dichloride, acetone, ethyl acetate, butylene glycol, the like and mixtures thereof. A mixture of ethyl acetate and ethanol is presently preferred. The volume ratio of ethyl acetate to ethanol is preferably about 10:1 to about 1:1, more preferably about 2:1 to about 4:1.

The percent weight (grams) to volume (milliliters) of the PVAC to the solvent is about 1 to about 20 percent, and more preferably about 5 to about 10 percent (w/v).

The temperature at which the dissolving step is usually performed is preferably about 50 to about 90 degrees C., more preferably about 60 to about 80 degrees C.

The time period for the dissolving step is a time period sufficient for complete dissolution of the PVAC. This time is dependent upon the temperature at which the dissolving step is performed and the solvent utilized, as well as the concentration of the PVAC in the solvent.

In the admixing step, the solution and the liquid flavorant agent are admixed at a temperature at which there is substantially no degradation of the flavorant agent and at which the admixture is deformable. The admixing temperature is typically lower than the temperature at which the solution is formed. Furthermore, the admixing temperature is typically greater than about 20 degrees C. and less than that of the boiling point of the solvent as well as below the temperature at which the flavorant agent boils or degrades. Preferably, this admixing temperature is about 20 to about 140 degrees C., more preferably about 40 to about 60 degrees C.

The term "degradation", in its various grammatical forms, means chemical breakdown of the liquid flavorant agent resulting in reduction of the amount of flavorant agent available for release from the flavorant release composition upon mastication.

Admixing is continued for a time period sufficient to obtain a homogenous dispersion. This time period is dependent upon several facts including the solvent utilized, the amount of solvent utilized, the temperature at which the admixing step is carried out and the like. Typical admixing time periods for this step are about 10 minutes to about 24 hours.

The above-described optional sweetening agent can be present in the sustained flavorant release composition, as previously discussed. The sweetening agent can be admixed with the solution prior to, or with, the flavorant agent or with the homogenous dispersion.

Admixing of the sweetening agent with the solution or homogenous dispersion is for a time period effective to produce a homogenous dispersion. If, the sweetening agent is admixed with the flavorant agent containing homogenous dispersion, admixing continues for a time period effective to produce a second homogenous dispersion.

The resulting homogenous dispersion (either with or without the optional sweetening agent) can then be cast, extruded or otherwise formed into the desired shape of the flavor releasing element, e.g., element 12 of FIG. 1. Formation can be performed before or after removal of the solvent. Furthermore, formation can be performed before or after the resulting homogenous dispersion is cooled.

Preferably, cooling is performed at a rate that prevents premature crystallization (opacity) of the dispersion, i.e., crystallization of the polymer while observable, liquid solvent is present. Such crystallization forms a non-homogenous flavor releasing element. It is presently believed that premature crystallization adversely effects flavor release. In the cooling step, the homogenous dispersion is cooled to about ambient temperature, i.e., a temperature of about 20 to about 30 degrees C.

The viscosity of the homogenous dispersion, with or without the optional sweetening agent, is about 1 to about 1500, preferably about 1 to about 500 centipoise (cp) at the admixing temperature discussed hereinabove, and about 1 to about 7000, preferably about 1 to about 1000 cp at ambient temperature.

In the solvent removing step, the solvent is removed at a temperature at which there is substantially no degradation of the flavoring agent (and of the optional sweetening agent, if utilized). Furthermore, the solvent is removed at a relatively slow rate sufficient to inhibit premature crystallization of the dispersion. The sustained flavorant release composition is thereby produced, preferably in the form of the flavor releasing element.

Solvent removal is preferably performed under approximately ambient conditions of a temperature of about 20 to about 30 degrees C. and a pressure of about one atmosphere. The time period required depends upon the thickness of the cast or otherwise formed homogenous dispersion. Typically this time period is about 30 to about 480 minutes per millimeter of casting thickness.

Alternatively, solvent removal can be performed at a reduced pressure provided that volatile components of the flavorant agent are not also removed.

The residual solvent concentration, if any, in the sustained flavorant release composition is within acceptable concentration levels of the Federal Drug Administration (FDA) for the solvent utilized. Furthermore, the residual solvent should not adversely effect flavor or flavor release.

Once formed into a sheet or other form for use in a chewing gum, the flavorant release composition is referred to as a flavor releasing element.

A typical flavor releasing element, in sheet form, preferably has a thickness of about 10 to about 150 mils, more preferably about 15 to about 125 mils.

The flavor releasing element is then juxtaposed with the gum stock element. Exemplary means for juxtaposition include lamination, coating and the like.

In a unique alternate production method, the solvent is removed after the homogenous dispersion and gum stock element have been juxtaposed as desired. Specifically, the flavorant release composition is applied as the homogenous dispersion, described above, to the gum stock element 14 (FIG. 1). Then, the solvent is removed to produce the flavor releasing element 12 juxtaposed with the gum stock element 14.

Figure 2:
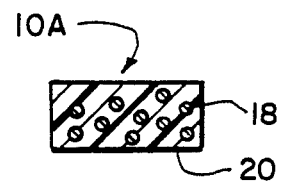
FIG. 2 is an enlarged, cross-sectional view of a second embodiment of a chewable structure embodying the present invention in which a sustained flavorant release composition is dispersed in a gum base composition.

Alternatively, the flavorant release composition can be dispersed in granular form within the gum base composition. This is shown in FIG. 2 which is a cross-sectional view of a second embodiment of a chewable structure 10A of the present invention. The chewable structure 10A includes flavorant release composition granules 18 dispersed in a gum base composition 20.

A conventional method of obtaining granules 18 is to pulverize the above produced flavorant release composition after freezing it as in a dry-ice/acetone bath, liquid nitrogen or the like. This method of producing granules prevents excess heating of the flavorant release composition, which can result in degradation of the flavorant agent. The granules 18 are then admixed with the gum base composition 20 by known means such as kneading or the like at a temperature that does not cause degradation of the flavorant agent.

Illustrative sustained flavorant release compositions were prepared in accordance with the following EXAMPLES 1 and 2.

EXAMPLE 1

Preparation of Sustained Flavorant Release Composition

In a suitable vessel, 3.0 grams (gm) of polyvinyl acetate having a number average molecular weight of about 167,000 daltons (polyvinyl acetate, high molecular weight, commerically available from Aldrich Chemical Co., Milwaukee, WI) were dissolved in 50 milliliters (ml) of an organic solvent which was an admixture of 35 ml of ethyl acetate and 15 ml of ethanol. The temperature was about 70 degrees C. and the time period for dissolving was about 30 to 60 minutes.

The temperature of the solution was reduced to about 50 degrees C. prior to introducing 3.0 ml of the liquid flavorant agent, peppermint oil. This temperature was maintained for the duration of the mixing time which was about 15 minutes. A homogenous dispersion was obtained.

The homogenous dispersion was removed from the heat source and cooled to a temperature of about 25 degrees C. over a time period of about 5 to 10 minutes.

The cooled homogenous dispersion was then poured into a suitable flat, open container.

The solvent was then evaporated from the homogenous dispersion under ambient conditions, and over a time period of 48 hours. The sustained flavorant release composition in film shape and having a thickness of about 20 mils was recovered and utilized in the chewable structure as explained hereinafter in EXAMPLE 3.

EXAMPLE 2

Preparation of Sustained Flavorant Release Composition Including a Sweetening Agent A flavorant release composition of the present invention utilizing an optional sweetening agent was prepared as in EXAMPLE 1 with the further step of admixing 0.15 gm of the sweetening agent, saccharin calcium, to the formed homogenous dispersion. Admixing of the sweetening agent was performed at about 50 degrees C. and for about 15 minutes to produce a second homogenous dispersion.

The solvent was then evaporated from that homogenous dispersion under ambient conditions and over a time period of 48 hours. The sustained flavorant release composition in film shape and having a thickness of about 20 mils was recovered and utilized in the chewable structure as explained hereinafter in EXAMPLE 3.

Chewable structures were prepared utilizing the sustained flavorant release compositions of EXAMPLES 1 and 2. EXAMPLE 3 is illustrative of the preparation of such chewable structures.

EXAMPLE 3

Preparation of Chewable Structures

The flavorant release composition films of EXAMPLES 1 and 2 were then cut into the desired size and conventionally wrapped around a commercially available gum stock composition available from Warner-Lambert under the trade designation Trident to produce the chewable structures. The quantity, e.g., weight, of flavorant release composition film and of the gum stock composition, as well as the wrapping arrangement, were selected so that the weight ratio of gum base composition to sustained flavorant release composition was within the before-discussed range.

The resulting chewable structures prepared in accordance with the above examples exhibited flavorant agent release or combined flavorant agent and sweetening agent release for a time period of about 360 minutes. That time of flavor release was typical for similarly prepared chewing gums and illustrates the great advance of a chewing gum structure of the present invention over the art.

Various shapes and configurations of the chewable structure can be obtained by varying the spatial relationship of the flavor releasing element and the gum stock element and the shape of each. Thus, the chewable structure is not limited to the single or double layer planar configuration as shown in FIG. 1 or FIG. 2.

Figure 3:
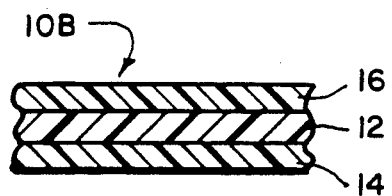
FIG. 3 is a greatly enlarged, fragmentary, longitudinal cross-sectional view of a third embodiment of a chewable structure embodying the present invention that includes two sustained flavor releasing elements and a gum stock element.

A three element chewable structure 10B is shown as a third embodiment of the present invention in FIG. 3. The chewable structure 10B includes one sustained flavor releasing element 12, a gum stock element 14 and another (second) sustained flavor releasing element 16. The other flavor releasing element 16 is applied to the element 12 by known means. Alternatively, the other flavor releasing element 16 can be applied to the element 12 as a homogenous dispersion (as discussed previously with reference to the method for producing the first embodiment).

It is understood that the relative positions of the elements 12, 14, and 16 can be interchanged in the chewable structure 10B. Thus, for example, the gum stock element 14 can be positioned between the two flavor releasing elements 12 and 16.

The one flavor releasing element 12 can be produced from a first flavorant release composition, and the second sustained flavor releasing element 16 can be produced from a second flavorant release composition. The two flavorant release compositions can be identical to, or different from, each other. Thus, different flavorant agents can be released.

Also, the rate of release of the flavorant agents can be identical to, or different from, each other by varying the amount, and/or number average molecular weight, of the PVAC utilized in the respective flavorant release composition. By varying these above parameters, the sensation of flavor can be changed with time.

The weight ratio of the gum base composition to total weight of the two sustained flavorant release compositions is preferably about 20:1 to about 4:1, more preferably about 10:1 to about 5:1, respectively. This is in accordance with the before-discussed requirement that the sum of the weights of all of the flavorant release compositions utilized in the structure be employed when calculating this weight ratio.

Figure 4:
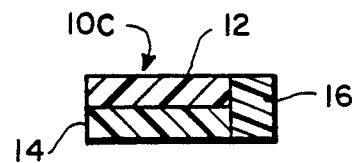
FIG. 4 is a greatly enlarged, traverse, cross-sectional view of a fourth embodiment of a chewable structure embodying the present invention that includes a second sustained flavor releasing element juxtaposed along the longitudinal edges of a first sustained flavor releasing element and a gum stock element.

Another three element chewable structure 10C is shown as a fourth embodiment of the present invention in FIG. 4. The chewable structure 10C includes a one flavor releasing element 12, a gum stock element 14 and another flavor releasing element 16 juxtaposed along the longitudinal edges of the one flavor releasing element 12 and the gum stock element 14. It is understood that the relative positions of the elements 12, 14 and 16 can be interchanged in the chewable structure 10C.

Figure 5:
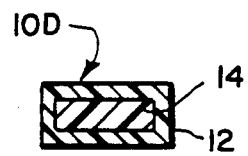
FIG. 5 is a greatly enlarged, transverse, cross-sectional view of a fifth embodiment of a chewable structure embodying the present invention in which a rectangular section of a gum stock element is enveloped in a sustained flavor releasing element.

A rectangular cross section of a fifth embodiment of a chewable structure 10D of the present invention is shown in FIG. 5. The chewable structure 10D includes a sustained flavor releasing element 12 enveloping a gum stock element 14.

The term "envelop", as used herein in its various grammatical forms, defines the macroscopic relationship of the elements wherein one element enfolds the other element either partially or completely.

It will be appreciated that the relative positions of the elements 12 and 14 can be interchanged in the chewable structure 10D. Thus, the gum stock element 14 can envelop the flavor releasing element 12. Furthermore, the chewable structure 10D can include another sustained flavor releasing element. These further alternatives are not illustrated.

Figure 6:
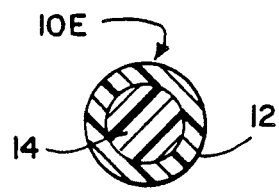
FIG. 6 is an enlarged, transverse, cross-sectional view of a sixth embodiment of the present invention, in which a circular section of a gum stock element is enveloped in an annulus shaped sustained flavor releasing element.

A cross-sectional view of a sixth embodiment of a chewable structure 10E of the present invention is shown in FIG. 6. The chewable structure 10E includes a gum stock element 14 having a circular transverse cross section. Thus, the gum stock element 14 can be spherical or cylindrical in shape. This gum stock element 14 is enveloped by the sustained flavor releasing element 12.

The relative positions of the elements 12 and 14 can be interchanged in the chewable structure 10E. Thus, the gum stock element 14 can envelop the flavor releasing element 12. Furthermore, the chewable structure can include a second sustained flavor releasing element. These further alternatives are not illustrated.

This invention has been described in terms of specific embodiments set forth in detail. It should be understood, however, that these embodiments are by way of illustration only, and that the invention is not necessarily limited thereto. Modifications and variations will be apparent from this disclosure and may be resorted to without departing from spirit of this invention, as those skilled in the art will appreciate. Accordingly, such variations and modifications of the disclosed invention are considered to be within the purview and scope of this invention.

We claim:

1. A sustained flavorant release composition suitable for providing sustained release of a flavorant for a chewable structure consisting essentially of a homogenous dispersion of a liquid flavorant agent and polyvinyl acetate having a number average molecular weight of about 150,000 to about 200,000 daltons, the weight ratio of said liquid flavorant agent to said polyvinyl acetate being about 1:5 to about 5:1, respectively, said composition being substantially free of a separate plasticizing agent that is distinct from said liquid flavorant agent.

2. The composition in accordance with claim 1 wherein said number average molecular weight of said polyvinyl acetate is about 160,000 to about 175,000 daltons.

3. The composition in accordance with claim 1 wherein said weight ratio of said liquid flavorant agent to said polyvinyl acetate is about 1:2 to about 2:1, respectively.

4. The composition in accordance with claim 1 further including a sweetening agent present in a sweetening effective amount.

5. The composition in accordance with claim 4 wherein said sweetening effective amount is less than about 0.1 weight percent of said composition.

6. A method of producing a sustained flavorant release composition, suitable for providing sustained release of a flavorant for a chewable structure consisting essentially of the steps of:
   (a) admixing polyvinyl acetate having a number average molecular weight of about 150,000 to about 200,000 daltons dissolved in a volatile, nonreactive organic solvent with a liquid flavorant agent to produce a homogenous dispersion, the weight ratio of said liquid flavorant agent to said polyvinyl acetate being about 1:5 to about 5:1, respectively, said admixing being carried out at a temperature at which there is substantially no degradation of said flavorant agent and at which said admixture is deformable; and
   (b) removing said solvent at a temperature at which there is substantially no degradation of said flavorant agent to produce said sustained flavorant release composition that is substantially free of a plasticizing agent that is distinct from said flavorant agent.

7. A method of producing a sustained flavorant release composition suitable for providing sustained release of a flavorant for a chewable structure, consisting essentially of the steps of:
   (a) dissolving polyvinyl acetate in a volatile, nonreactive organic solvent to produce a solution having a deformable viscosity at the temperature of said solution, said polyvinyl acetate having a number average molecular weight of about 150,000 to about 200,000 daltons;
   (b) admixing with said solution a liquid flavorant agent to produce a homogenous dispersion, the weight ratio of said liquid flavorant agent to said polyvinyl acetate being about 1:5 to about 5:1, respectively, said admixing being carried out at a temperature at which there is substantially no degradation of said flavorant agent and at which said admixture is deformable; and,
   (c) removing said solvent at a temperature at which there is substantially no degradation of said flavorant agent to produce said sustained flavorant release composition that is substantially free of a plasticizing agent that is distinct from said flavorant agent.

8. The method in accordance with claim 7 wherein said number average molecular weight of said polyvinyl acetate is about 160,000 to about 175,000 daltons.

9. The method in accordance with claim 7 wherein said weight ratio of liquid flavoring agent to said polyvinyl acetate is about 1:2 to about 2:1, respectively.

10. The method in accordance with claim 7 wherein said temperature during said dissolving of said polyvinyl acetate is about 50 to about 90 degrees C.

11. The method in accordance with claim 7 further comprising the step, performed before step (c), of admixing with the homogenous dispersion a sweetening agent in a sweetening effective amount to produce a second homogenous dispersion.

12. A method of producing a sustained flavorant release composition suitable for providing sustained release of a flavorant for a chewable structure consisting essentially of the steps of:
   (a) dissolving polyvinyl acetate in a volatile, nonreactive organic solvent at a temperature of about 50 to about 90 degrees C. to produce a solution, said polyvinyl acetate having a number average molecular weight of about 160,000 to about 175,000 daltons;
   (b) admixing with said solution a liquid flavorant agent at a temperature of about 40 to about 60 degrees C. to produce a homogenous dispersion, the weight ratio of said flavorant agent to said polyvinyl acetate being about 1:2 to about 2:1; and
   (c) removing said solvent at a temperature at which there is substantially no degradation of said flavorant agent to produce said sustained flavorant release composition.

13. A chewable structure comprising:
   (a) at least one sustained flavorant release composition consisting essentially of a homogenous dispersion of a liquid flavorant agent and polyvinyl acetate having a number average molecular weight of about 150,000 to about 200,000 daltons, the weight ratio of said liquid flavorant agent to said polyvinyl acetate being about 1:5 to about 5:1, respectively, said sustained flavorant release composition being substantially free of a plasticizing agent that is distinct from said flavorant agent; and,
   (b) a gum base composition juxtaposed with said sustained flavorant release composition, the weight ratio of said gum base composition to the total weight of all said sustained flavor release composition being about 20:1 to about 4:1, respectively.

14. The chewable structure of claim 13 wherein said number average molecular weight of said polyvinyl acetate is about 160,000 to about 175,000 daltons.

15. The chewable structure in accordance with claim 13 wherein said weight ratio of said liquid flavoring agent to said polyvinyl acetate is about 1:2 to about 2:1, respectively.

16. The chewable structure in accordance with claim 13 wherein said flavorant release composition is dispersed within said gum base composition.

17. The chewable structure in accordance with claim 13 wherein at least one said sustained flavorant release composition is at least one sustained flavor releasing element and said gum base composition is a gum stock element.

18. The chewable structure in accordance with claim 17 further comprising:
another sustained flavor releasing element juxtaposed with at least one said gum stock element and said one sustained flavor releasing element, said other sustained flavor releasing element including another flavorant release composition consisting essentially of a homogenous dispersion of a second liquid flavorant agent and a second polyvinyl acetate having a number average molecular weight of about 150,000 to about 200,000 daltons, the weight ratio of said second liquid flavorant agent to said second polyvinyl acetate being about 1:5 to about 5:1, respectively, said other flavorant release composition being substantially free of a plasticizing agent that is distinct from said second liquid flavorant agent.

19. The chewable structure in accordance with claim 18 wherein said one and said other sustained flavorant release compositions are identical.

20. A chewable structure comprising:
(a) at least one sustained flavor releasing element including one sustained flavorant release composition consisting essentially of a homogenous dispersion of a liquid flavorant agent and polyvinyl acetate having a number average molecular weight of about 160,000 to about 175,000 daltons, the weight ratio of said liquid flavorant agent to said polyvinyl acetate being about 1:2 to about 2:1, respectively, said one flavorant release composition being substantially free of a separate plasticizing agent that is distinct from said liquid flavorant agent; and
(b) a gum stock element juxtaposed with said one sustained flavor releasing element, said gum stock element including a gum base composition, the weight ratio of said gum base composition to the total weight of all said sustained flavorant release compositions being about 10:1 to about 5:1, respectively.

21. The chewable structure in accordance with claim 20 wherein said one sustained flavorant release composition includes a sweetening agent in an effective sweetening amount.

22. A chewable structure comprising:
(a) at least one sustained flavor releasing element including one sustained flavorant release composition consisting essentially of a homogenous dispersion of a liquid flavorant agent and polyvinyl acetate having a number average molecular weight of about 160,000 to about 175,000 daltons, the weight ratio of said liquid flavorant agent to said polyvinyl acetate being about 1:2 to about 2:1, respectively, said one flavorant release composition being substantially free of a separate plasticizing agent that is distinct from said liquid flavorant agent; and
(b) a gum stock element enveloped by said one sustained flavor releasing element, said gum stock element including a gum base composition, the weight ratio of said gum base composition to the total weight of all said sustained flavorant release compositions being about 10:1 to about 5:1, respectively.

23. The chewable structure in accordance with claim 22 wherein said one sustained flavorant release composition includes a sweetening agent in an effective sweetening amount.

* * * * *